G. H. DAY.
TEMPLE FOR SPECTACLES.
APPLICATION FILED SEPT. 24, 1919.
1,335,823.
Patented Apr. 6, 1920.
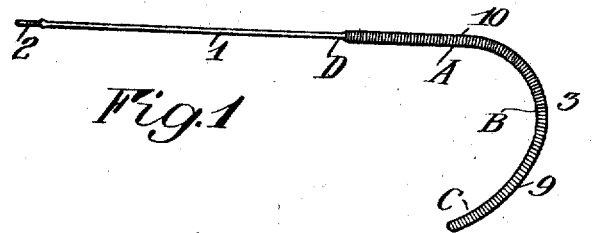
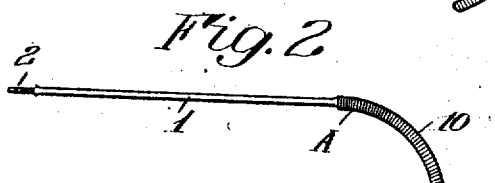
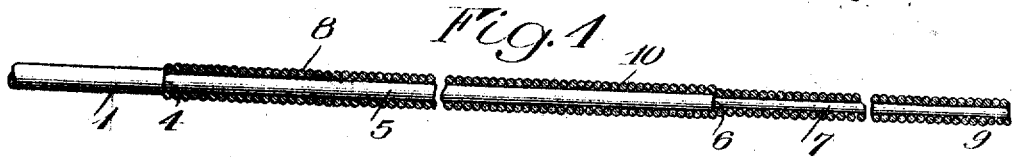
INVENTOR
George H. Day
BY
Frederick T. Church
his ATTORNEY

UNITED STATES PATENT OFFICE.

GEORGE H. DAY, OF ROCHESTER, NEW YORK.

TEMPLE FOR SPECTACLES.

1,335,823. Specification of Letters Patent. Patented Apr. 6, 1920.

Application filed September 24, 1919. Serial No. 325,871.

*To all whom it may concern:*

Be it known that I, GEORGE H. DAY, of Rochester, in the county of Monroe and State of New York, have invented certain new and useful Improvements in Temples for Spectacles; and I do hereby declare the following to be a full, clear, and exact description of the same, reference being had to the accompanying drawing, forming a part of this specification, and to the reference-numerals marked thereon.

My present invention relates to optics and more particularly to eyeglasses and spectacles, and it has for its object to improve the ear engaging portions or temples of spectacles in such manner as to render them more comfortable to the wearer and better adapted to maintain their adjustment so that the spectacle frames are held in a comfortable and proper position on the nose. To these and other ends the invention resides in certain improvements and combinations of parts all as will be hereinafter more fully described, the novel features being pointed out in the claims at the end of the specification.

In the drawings:

Figure 1 is a side view of a spectacle temple constructed in accordance with and illustrating one embodiment of my invention;

Fig. 2 is a side view of a modified temple;

Fig. 3 is a top view of the temple shown in Fig. 2;

Fig. 4 is an enlarged fragmentary sectional view partly broken away, of the stock from which both forms of temples are made before they are shaped, and Figs. 5, 6, and 7 are, respectively, similar sectional views each showing a modification of the structure.

Similar reference numerals throughout the several views indicate the same parts.

I will first describe the specific construction of my improved temple as it is very simple, and then explain its theory and the reasons for its novel features. Referring first to the embodiment shown in Fig. 1, the temple comprises a side bar 1 the body of which may be of the usual strength and design and provided at its forward end with the usual single pivot knuckle 2 for hinged attachment to the spectacle frame carrying the lenses but which it is not necessary to illustrate herein. At its rear end the bar merges into an ear engaging hook indicated generally at 3. The interior formation of this hook is shown in Fig. 4. At the point where the hook begins the side bar 1 is provided with a shoulder 4 and a reduced portion 5 extending through about half or a little more of the length of the hook. At the end of the reduced portion 5 is another shoulder 6 beyond which the bar is further reduced at 7 all the way to its extremity. These reduced portions of the bar constitute a stiffening core for the hook the exterior or body and contacting surface of which is constituted by a tubular member 8 formed by a tight helical winding of wire of suitable diameter that extends from the first shoulder 4 continuously to the end of the smaller terminal reduced portions 7 of the side bar. This wire winding may be constituted of one or any desired number of strands but I prefer to use four strands. The periphery of this tube or helix may be swaged to give it a substantially smoothly cylindrical surface for contact with the ear, as shown in Figs. 1, 2 and 3, or left in the corrugated form of the natural wire, as shown in the enlarged figures. In the form of the device at present under discussion and shown in Figs. 1 and 4, the lower portion or extremity 9 of the hook is thus originally of smaller diameter than the upper portion or body 10, though both are preferably of uniform individual diameter as shown in Fig. 4. I prefer, however, to finally swage the portion 10 of Fig. 4 to a greater extent than the portion 9 so that both are brought to the same diameter as shown in Fig. 1.

When the temple is in use (still referring to Figs. 1 and 4) a portion A of the hook rests on top of the ear; a portion B thereof at the back of the ear; and the end portion C beneath the ear so that the weight or downward pressure is borne by the first, forward strains are resisted by the second and upward tilting or disengagement is prevented by the third contact. It is customary to make temples of this kind of uniform weight, diameter and resiliency throughout the extent of the hook and often throughout the extent of both the side bar and hook. With such construction, undue and uncomfortable pressure is apt to be exerted upon the nose of the wearer where the bridge of the lens frame rests, either by too great a curvature and pressure due to a short forward length adjustment at B or too great curvature and pressure at the under contact point C which, aside from being locally uncomfortable or even painful, increases the pressure at A also and further has a tendency to bow the side bar 1 downwardly approximately at the point B, resulting in altering the adjustment or set of the spectacle as well as creating a permanent tension. With my improved construction, on the other hand, the ear engaging hook 3 is relatively stiff and rigid or inflexible from the point A to the point B and, in fact, from the point D to the point B as these points go into engagement or out of engagement with the ear by a simple up or down motion. The portion 9, however, carrying the point C must be flexed to permit it to assume its position beneath the ear and with my construction, this terminal portion 9 is much more flexible and uniformly flexible and more resilient than the rest of the hook so that it is readily flexed to take position beneath the ear. When in position, it exerts enough upward pressure at the point C to prevent the temple and hook from lifting but at the same time, it is a very delicate, soft and agreeable pressure and does not impose any undue strain on the other parts at any other point. Besides this, it has a tendency to conform to the irregularities of the ear and distributes its pressure rather than imposing a local harsh contact at any one point.

In the type of temple shown in Fig. 2, the same parts and much the same functions are produced except that the extremity 9, instead of proceeding downwardly and forwardly to provide the contact C beneath the ear, proceeds downwardly and rearwardly with the compound curvature shown in Fig. 3, producing an additional inward bend permitting the said portion to conform to the curvature of the head of the wearer and take its grip against the same instead of beneath the ear.

Figs. 5 and 6 show modified ways of obtaining the increased resiliency of the portion 9. In the construction of Fig. 5, the reduced portion 7 of the guide bar 1 that furnishes the stiffening core for the lower portion or extremity of the hook, is omitted and the wire helix 10 alone relied upon to give the proper tension.

In the construction shown in Fig. 6, the reduced portion 7 is of even smaller diameter and is first wrapped with a finer wire helix 11 upon which the helix 10 is superposed. This produces a very smoothly flexible construction. In the devices of both Figs. 5 and 6, the portion 9 of the hook is of the same diameter as the body thereof before and after swaging while the shoulder 4 is omitted in Fig. 6, so that the portion 5 is not reduced but a straight continuation of the side bar 1 to which the front end of the wire wrapping is soldered.

Fig. 7 shows a construction including the elements of Fig. 6, with additions. The shoulder 4 is formed on an enlargement 12 of the side bar 1 so that the wrapped wire is of the same diameter as the bar at this point and the smaller body portion of the latter merges gradually into an increased diameter desired for the increase in the bearing surface of the ear engaging hook. The wire wrapping 8 includes an additional outer winding and these windings and the portion 5 are formed separately and soldered to the butt of the enlargement 12.

It will be observed that in all of the forms the increased resiliency occurs at the shoulder 6 of the reduced portion 7 or at a corresponding point in the neighborhood of or just below the point B.

I claim as my invention:

1. A spectacle temple comprising a side bar and an ear engaging hook embodying a portion adapted to rest on top of the ear, a portion adapted to engage behind the ear and a curved portion proceeding downwardly from the latter and of greater resiliency than either of the first mentioned portions so that it will have a tendency to bend at its point of connection with the portion to which it is directly attached.

2. A spectacle temple comprising a side bar and an ear engaging hook embodying a portion adapted to rest on top of the ear, a portion adapted to engage behind the ear, and a curved portion of uniform resiliency proceeding downwardly from the latter, said curved portion being of greater resiliency than either of the first mentioned portions.

3. A spectacle temple comprising a side bar and an ear engaging hook embodying a portion adapted to rest on top of the ear, a portion adapted to engage behind the ear and a curved portion proceeding downwardly from said last mentioned portion, the resiliency of said ear engaging hook being abruptly increased at the connecting point of the said curved portion.

4. A spectacle temple comprising a side bar and an ear engaging hook embodying a portion adapted to rest on the top of the ear, a portion adapted to engage behind the ear and a curved portion proceeding downwardly from said last mentioned portion, the first two mentioned portions being provided with a stiffening core and the said curved portion being of greater relative resiliency.

5. A spectacle temple comprising a side bar and an ear engaging hook embodying a portion adapted to rest on the top of the ear, a portion adapted to engage behind the ear and a curved portion proceeding downwardly from said last mentioned portion, the first two mentioned portions being provided with a stiffening core and the said curved portion being provided with a stiffening core of greater resiliency and constituted by a reduced extension of the first mentioned core.

6. A spectacle temple comprising a side bar and an ear engaging hook embodying a portion adapted to rest on top of the ear, a portion adapted to engage behind the ear and a curved portion proceeding downwardly from said last mentioned portion, the ear engaging hook being composed of a core piece covered with a helical wrapping of wire and of reduced diameter where forming the said curved portion of the hook to give such curved portion greater resiliency than the other portions.

GEORGE H. DAY.